United States Patent
Kabiry et al.

(10) Patent No.: US 12,524,358 B2
(45) Date of Patent: Jan. 13, 2026

(54) BANDWIDTH MANAGEMENT ALLOCATION FOR DISPLAYPORT TUNNELING

(71) Applicant: Intel Corporation, Santa Clara, CA (US)

(72) Inventors: Ziv Kabiry, Kfar-Saba (IL); Reuven Rozic, Binyamina (IL); Gal Yedidia, Bitzaron (IL)

(73) Assignee: Intel Corporation, Santa Clara, CA (US)

( * ) Notice: Subject to any disclaimer, the term of this patent is extended or adjusted under 35 U.S.C. 154(b) by 1290 days.

(21) Appl. No.: 16/908,702

(22) Filed: Jun. 22, 2020

(65) Prior Publication Data

US 2020/0320026 A1    Oct. 8, 2020

Related U.S. Application Data

(60) Provisional application No. 63/016,121, filed on Apr. 27, 2020.

(51) Int. Cl.
*G06F 13/20*  (2006.01)
*G06F 9/30*   (2018.01)

(52) U.S. Cl.
CPC .......... *G06F 13/20* (2013.01); *G06F 9/30101* (2013.01)

(58) Field of Classification Search
None
See application file for complete search history.

(56) References Cited

U.S. PATENT DOCUMENTS

| | | | | |
|---|---|---|---|---|
| 8,611,215 B2* | 12/2013 | Katibian | .............. | H04N 21/658 |
| | | | | 370/230.1 |
| 8,699,330 B2* | 4/2014 | Katibian | .............. | H04N 21/238 |
| | | | | 370/230.1 |
| 8,799,537 B1* | 8/2014 | Zhu | ....................... | G06F 13/385 |
| | | | | 710/14 |

(Continued)

FOREIGN PATENT DOCUMENTS

WO    WO-2006058067 A2 *  6/2006  ............. G09G 5/006

OTHER PUBLICATIONS

'Universal Serial Bus 4 (USB4) Specification—Version 1.0' Aug. 2019. (Year: 2019).*

(Continued)

*Primary Examiner* — Steven G Snyder
(74) *Attorney, Agent, or Firm* — Alliance IP, LLC

(57) ABSTRACT

A system can include a host router comprising connection manager logic, a display port adapter, and a display port adapter register to comprise display port adapter register values. A display port source device comprises a display port transmitter connected to the display port adapter. A display port configuration data (DPCD) register comprises display port configuration register values for the display port, the display port transmitter to write to the DPCD register. The display port adapter is to map DPCD register values to the display port adapter register. The connection manager logic is to receive a notification message requesting bandwidth allocation for the display port transmitter, determine an allocated bandwidth for the display port transmitter, and write the allocated bandwidth into the display port adapter register.

18 Claims, 12 Drawing Sheets

(56) References Cited

U.S. PATENT DOCUMENTS

| | | | | |
|---|---|---|---|---|
| 8,856,420 B2* | 10/2014 | Chandra | ............ | H04L 47/39 |
| | | | | 710/316 |
| 8,953,644 B2* | 2/2015 | Chandra | ............ | H04L 7/00 |
| | | | | 370/503 |
| 9,141,132 B2* | 9/2015 | Chandra | ............ | H04L 7/00 |
| 9,164,535 B2* | 10/2015 | Chandra | ............ | G06F 1/12 |
| 9,252,970 B2* | 2/2016 | Chandra | ............ | H04L 12/4625 |
| 9,323,698 B2* | 4/2016 | Park | ............ | H04L 69/08 |
| 9,508,282 B2* | 11/2016 | Hussain | ............ | G06F 13/362 |
| 9,565,132 B2* | 2/2017 | Chandra | ............ | H04L 45/52 |
| 9,697,159 B2* | 7/2017 | Chandra | ............ | G06F 13/4022 |
| 10,056,027 B2* | 8/2018 | Hussain | ............ | G09G 3/2096 |
| 10,241,949 B2* | 3/2019 | Kobayashi | ............ | G06F 13/4282 |
| 11,513,808 B2* | 11/2022 | Raghav | ............ | G06F 9/4406 |
| 2003/0191922 A1* | 10/2003 | Skull | ............ | G06F 15/8015 |
| | | | | 712/E9.024 |
| 2006/0171414 A1* | 8/2006 | Katibian | ............ | H04N 21/23805 |
| | | | | 370/468 |
| 2012/0008642 A1* | 1/2012 | Katibian | ............ | H04L 47/19 |
| | | | | 370/468 |
| 2012/0079162 A1* | 3/2012 | Jaramillo | ............ | G09G 5/12 |
| | | | | 710/316 |
| 2013/0042291 A1* | 2/2013 | Kambhatla | ............ | H04N 21/4363 |
| | | | | 725/127 |
| 2013/0163474 A1* | 6/2013 | Chandra | ............ | H04L 12/4625 |
| | | | | 370/254 |
| 2013/0163617 A1* | 6/2013 | Chandra | ............ | G06F 13/4022 |
| | | | | 370/503 |
| 2013/0166813 A1* | 6/2013 | Chandra | ............ | G06F 13/385 |
| | | | | 710/316 |
| 2013/0335430 A1* | 12/2013 | Douglas | ............ | G09G 5/006 |
| | | | | 345/520 |
| 2014/0122755 A1* | 5/2014 | Chandra | ............ | H04L 69/28 |
| | | | | 710/106 |
| 2014/0372663 A1* | 12/2014 | Chandra | ............ | H04L 49/505 |
| | | | | 710/316 |
| 2015/0113186 A1* | 4/2015 | Chandra | ............ | G06F 13/423 |
| | | | | 710/106 |
| 2015/0121115 A1* | 4/2015 | Chandra | ............ | G06F 13/4022 |
| | | | | 713/400 |
| 2015/0154137 A1* | 6/2015 | Kambhatla | ............ | G06F 13/4221 |
| | | | | 710/306 |
| 2016/0171925 A1* | 6/2016 | Hussain | ............ | G06F 13/362 |
| | | | | 710/12 |
| 2017/0069258 A1* | 3/2017 | Hussain | ............ | G06F 13/387 |
| 2017/0308493 A1* | 10/2017 | Kobayashi | ............ | G06F 13/4282 |
| 2019/0042507 A1* | 2/2019 | Venkatesan | ............ | H04L 25/08 |
| 2019/0200056 A1* | 6/2019 | Van Dusen | ............ | H04N 21/6373 |
| 2019/0317774 A1* | 10/2019 | Raghav | ............ | G06F 9/4411 |
| 2019/0332558 A1* | 10/2019 | Goel | ............ | H04L 47/41 |
| 2020/0192832 A1* | 6/2020 | Regupathy | ............ | G06F 13/1668 |
| 2020/0257649 A1* | 8/2020 | Kabiry | ............ | G06F 13/4295 |
| 2021/0004191 A1* | 1/2021 | Kambhatla | ............ | H04L 65/1094 |
| 2021/0055777 A1* | 2/2021 | Regupathy | ............ | G06F 1/266 |
| 2022/0113353 A1* | 4/2022 | Nelson | ............ | G01R 31/31705 |
| 2022/0129398 A1* | 4/2022 | Benjamini | ............ | G06F 13/20 |
| 2023/0088416 A1* | 3/2023 | Nelson | ............ | G06F 13/4282 |

OTHER PUBLICATIONS

'VESA DisplayPort Standard—Version 1, Revision 2' Jan. 5, 2010. (Year: 2010).*

'USB4 System Overview' by Rahman Ismail, Nov. 19, 2019. (Year: 2019).*

'USB4 Time Synchronization, Host Interface, Connection Manager and Thunderbolt 3 Compatibility' by Uri Hermoni et al., Nov. 20, 2019. (Year: 2019).*

'USB4 Specific Functionality' from drivers/thunderbolt/usb4.c, Google Git, Mika Westerberg et al., 2019. (Year: 2019).*

Machine Translation of Japanese Patent Application JP 2010041335 A, 2010. (Year: 2010).*

* cited by examiner

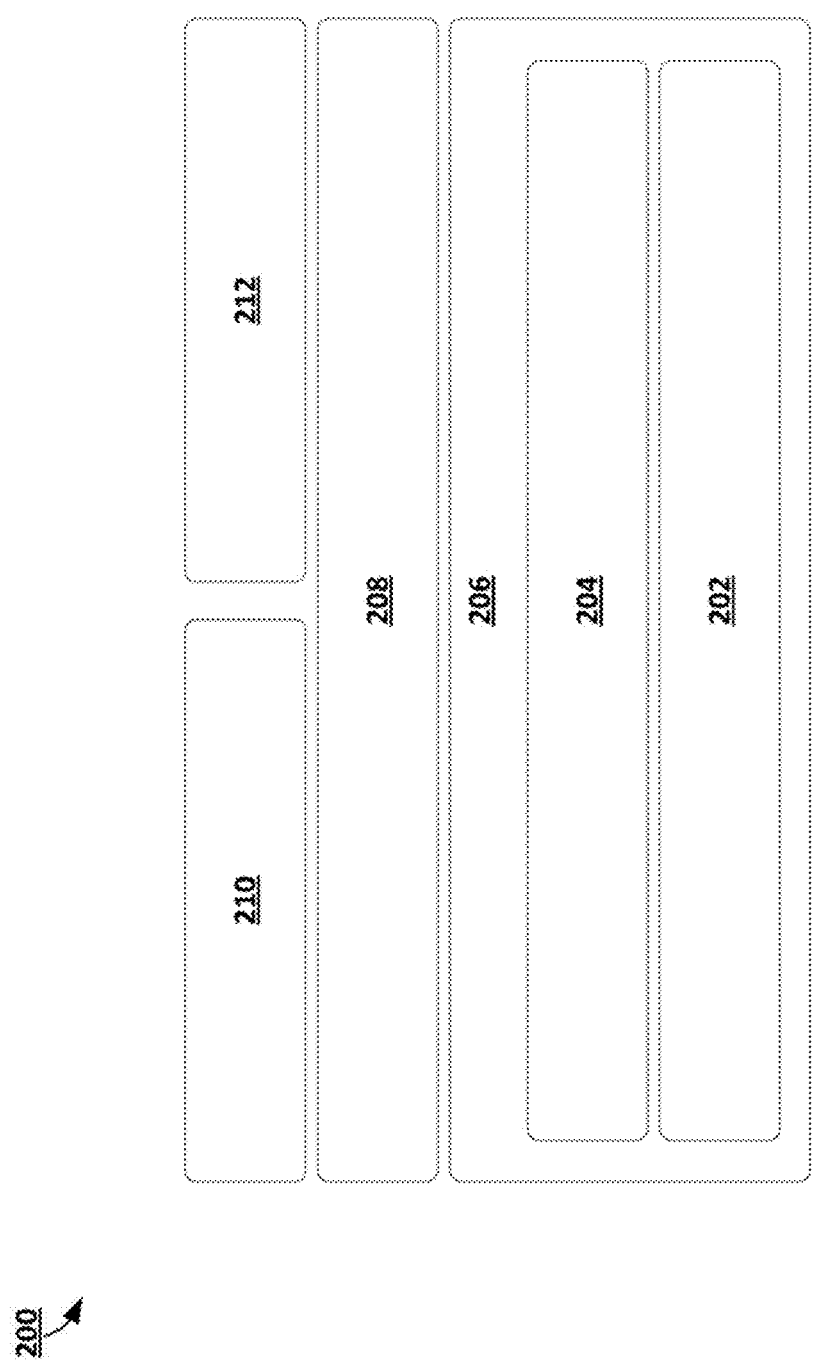

BANDWIDTH MANAGEMENT ALLOCATION FOR DISPLAYPORT TUNNELING

CROSS REFERENCE TO RELATED APPLICATION

Pursuant to 35 U.S.C. § 119(e), this application claims the benefit of U.S. Provisional Patent Application Ser. No. 63/016,121 titled "BANDWIDTH MANAGEMENT ALLOCATION FOR DISPLAYPORT TUNNELING," filed on Apr. 27, 2020, the entire contents of which are incorporated by reference herein.

BACKGROUND

DisplayPort (DP) is a digital display interface to connect an image, a video, and/or another multimedia source to a display device, such as a computer monitor. Universal Serial Bus (USB) is a communications and interconnect protocol. USB protocols are germane to cables and connectors, as well as for protocols for communication and power delivery between computers, peripheral devices, and other components.

BRIEF DESCRIPTION OF THE DRAWINGS

FIG. 2A is a schematic diagram of an example universal serial bus protocol stack in accordance with embodiments of the present disclosure.

Figures are not drawn to scale. Like reference numerals refer to like parts throughout the various figures.

DETAILED DESCRIPTION

Figure 1:
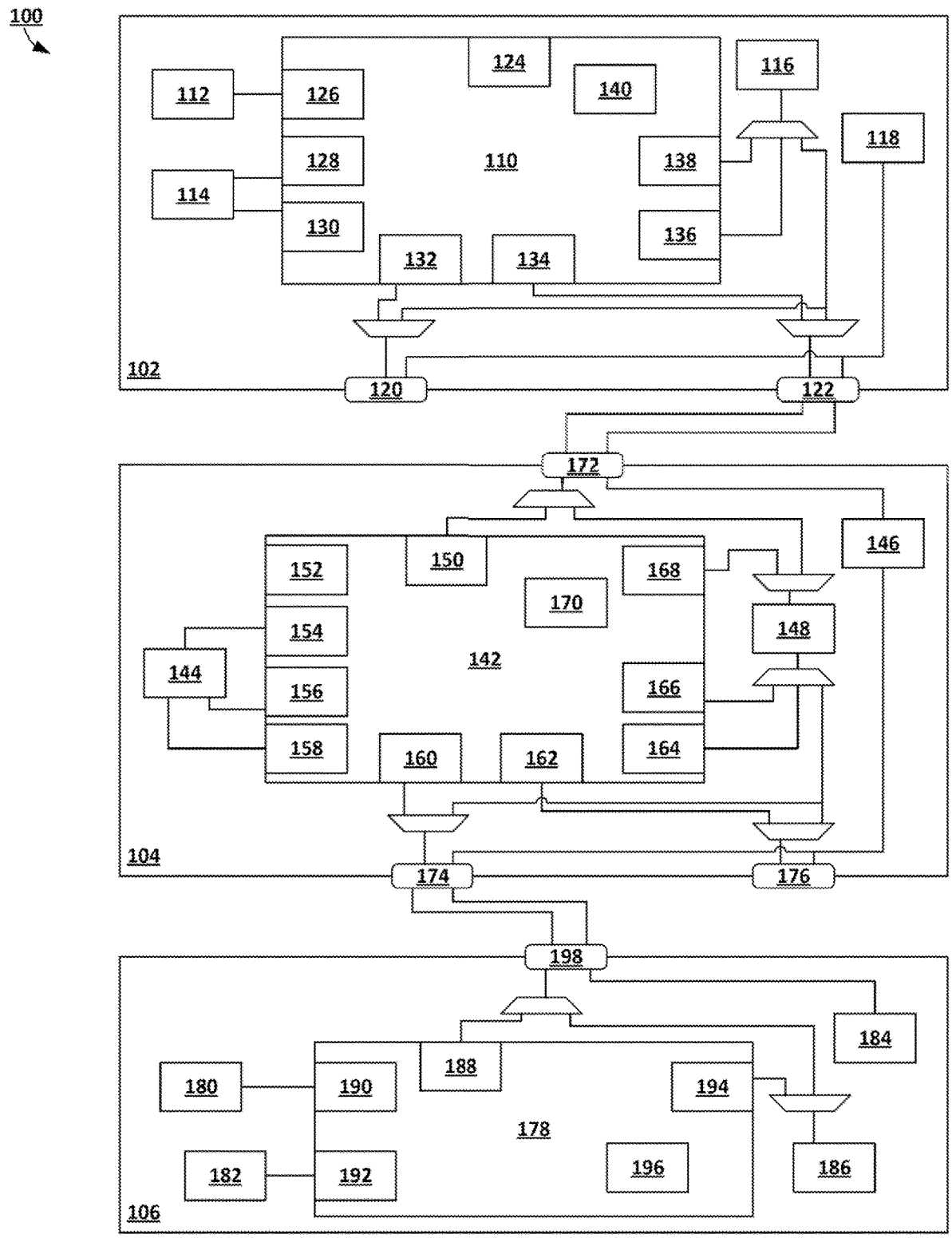
FIG. 1 is a schematic diagram of an example universal serial bus system in accordance with embodiments of the present disclosure.

FIG. 1 is a schematic diagram of an example universal serial bus (USB) system 100 in accordance with embodiments of the present disclosure. FIG. 1 illustrates the dual bus architecture of an example USB system 100, such as those implemented by USB4 or higher protocols. As architected, backward compatibility is supported with minimum interoperability starting at USB 2.0, working up through USB 3.2, and finally up to USB4 based on the highest common bus level supported across the interconnected components.

The USB system 100 can include a USB4 host 102 connected to a USB4 hub 104 by a USB link. The USB4 hub 104 can be connected to a USB4 device 106 by a USB link. The USB4 hub 104 can also be connected to other types of devices, such as displays or peripherals or other types of devices. The USB4 host 102 can be (or can be coupled to) a host device, such as a host device, computer, server, motherboard, processor or processor bank, or other type of host device. The USB4 hub 104 can be (or can include) a dongle, docking station, or other intermediate device. The USB4 device 106 can be an endpoint device, peripheral device, memory, or other type of device that connects to the USB4 host 102 and/or USB4 hub 104.

The system 100 can include a USB4 host 102. The USB4 host can include a host router 110, an internal host controller, and DisplayPort source 112, such as a DisplayPort2.0 source. The DisplayPort2.0 (or DP2.0) source can be a graphics processor and can include a DisplayPort transmitter (DPTX) that supports DP2.0 and higher. The DPTX can be compliant with a Video Electronics Standards Association (VESA) DisplayPort 2.0 protocol standard or future DisplayPort protocol standards versions.

A USB4 host supports 20G USB4 operation (Gen2×2) and optionally 40G USB4 operation (Gen3×2). A USB4 host can also support DisplayPort Alt Mode on all of its DFP. See the USB Type-C Specification for a full definition of the requirements and details regarding DisplayPort Alt Mode support on a DFP.

A USB4 host can also optionally contain a PCIe controller 114. PCIe controller 114 can include (or be connected to) a PCIe root complex or PCIe switch complex for controlling PCIe-based routing to one or more peripheral devices. The PCIe controller 114 can be connected to the USB4 host router 110 through one or more PCIe adapters (e.g., PCIe downstream facing adapters 128, 130). The USB4 hub 104 can include (or be connected to) a PCIe switch 144 via PCIe upstream facing adapter 154 and PCIe downstream facing adapters 156 and 158. The USB4 device 106 can include a PCIe function 180 that is the PCIe downstream connected component or endpoint device that communicates with the PCIe controller 114 across the USB4 fabric. The USB4 device router 178 can include a PCIe upstream facing adapter 190 to couple the PCIe function 180 with upstream connected components, such as the USB4 hub 104, PCIe switch 144, and PCIe controller 114.

The USB4 host 104 can include a USB host router 110. The USB4 hub 106 can include a USB hub router 142. The USB4 device 106 can include a USB device router 178. A router is a fundamental building block of the USB4 architecture. A router maps Tunneled Protocol traffic to USB4 packets and routes packets through the USB4 fabric. A router also distributes and synchronizes time throughout the USB4 Fabric via its Time Management Unit (TMU), such as TMU 140, 170, and 196. A router is discovered and configured by a connection manager (e.g., a host interface adapter) 124 located within the USB4 host. The router includes a flat point-to-point, configurable switch necessary to create the internal paths between adapters. One router typically exists within each instance of a USB4 host 102, USB4 hub 104, or USB4 device 106. There are two types of Routers: Host Routers and Device Routers.

USB4 host or USB4 peripheral device can optionally support interoperability with Thunderbolt 3 (TBT3) products. A USB4 hub is required to support interoperability with Thunderbolt 3 products on all of its DFP. A USB4-Based Dock is required to support interoperability with Thunderbolt 3 products on its UFP in addition to all of its DFP.

When interoperating with a TBT3 product, Thunderbolt Alt Mode is established on the link between products. The USB Type-C Specification describes how a USB4 product negotiates and enters Thunderbolt Alt Mode.

The USB4 host 102 can include (or can be connected to) a display port (DP) source 112, such as a graphics processing unit (GPU) or other source of graphics, video, images, etc. The USB4 host router 110 can include a DP_IN adapter 126 that can facilitate an interface to the DP source 112. In embodiments, the DP source can be a USB4 peripheral device or can be connected to the USB4 host router 110 via a DisplayPort-based interconnect (e.g., via a DisplayPort 2.0 protocol interconnect).

The USB4 hub 104 can include a DP OUT adapter 152 for outputting DP signaling to a DP sink, such as a display or monitor. The USB4 hub 104 can also transmit DP signaling via a USB4 tunnel to the USB4 device 106. The USB4 device 106 can include a DP OUT adapter 192 for outputting DP signals to a DP sink 182, which can be a display or monitor.

The internal Enhanced SuperSpeed host 116 exposes one or more Downstream USB3 ports, which can be connected to a USB Endpoint or Downstream USB3 Protocol Adapter. The upstream port of the internal Enhanced SuperSpeed Hub interfaces with an Upstream USB3 Protocol Adapter that forwards packets to the Upstream Facing Port of the USB4 hub.

Each router contains up to 64 adapters. Adapters provide an interface between a router and an external entity. There are three types of Adapters: Protocol Adapters, Lane Adapters, and Control Adapters. A Protocol Adapter is used to translate between a supported native protocol and a USB4 tunnel. There are four types of Protocol Adapters: USB3 Adapters 136, 138, 164, 166, 168, and 194, DisplayPort (DP) Adapters 126, 152, and 182, PCIe Adapters 128, 130, 154, 156, 158, and 190, and Host Interface Adapters 124.

A router can support an internal Control Adapter that is used solely for transmitting and receiving Control packets to and from the Transport Layer. Unlike the non-Control Adapters, the Control Adapter does not connect directly to a Link and thus does not have a Physical Layer associated with it.

A USB4 Port is the entity that provides the USB4 functional interface that resides on each end of a USB4 Link. It consists of the transmit and receive Lanes of the USB4 data bus along with a two-wire Sideband (SB) Channel (SBTX/SBRX). USB4 Ports operate as either a Single-Lane Link or Dual-Lane Link. When operating as a Single-Lane Link, Lane 1 of the USB4 Port is disabled. When operating as a Dual-Lane Link, Lanes 0 and 1 are logically bonded together to provide a single data channel. Example USB4 ports are shown as elements 132, 134, 150, 160, 162, and 188. The USB4 ports can accommodate a USB Type-C connector or Thunderbolt (e.g., TBT3) type connector, etc.

The primary communication channel of the USB4 Fabric is over the USB4 Link that interconnects two USB4 Ports. The USB4 Link transports packets for both Tunneled Protocol traffic and bus management traffic between Routers. The Sideband Channel of a USB4 Port is used to initialize and manage the USB4 Link between the USB4 Ports. For a USB4-enabled USB Type-C port, the complete interface includes a USB4 Port, a USB 2.0 data bus, and the USB Type-C Configuration Channel (CC) along with power/ground (VBUS, VCONN and GND).

At a high level, a USB4 hub 104 is functionally similar to a USB 3.2 hub—it consists of one Upstream Facing Port and one or more Downstream Facing Ports. USB4 hub 104 functionally operates as a tree-like structure for enabling one or more Downstream Facing Ports to be served by one Upstream Facing Port, typically for the purpose of port expansion.

In addition to the USB4-specific hub functionality, USB 3.2 and USB 2.0 hub functionality is supported such that Downstream Facing Ports of a USB4 hub can support backward-compatibility with USB 3.2 and USB 2.0 devices. USB 2.0 functionality can be provided via USB 2.0 host 118 connected to a USB 2.0 hub 146 and USB 2.0 function 184.

A USB4 hub contains a Device Router, an Enhanced SuperSpeed USB hub 148, a PCIe switch, and a USB 2.0 hub. A USB4 hub supports 20G USB4 operation (Gen2x2) and 40G USB4 operation (Gen3x2). A USB4 hub is required to support DisplayPort Alt Mode on all of its DFP. See the USB Type-C Specification for a full definition of the requirements and details regarding DisplayPort Alt Mode support on a DFP.

The USB4 host 102, hub 104, and device 106 can include one or more USB Type-C connector ports 120, 122, 172, 174, 176, and 198. The USB Type-C connector ports can receive USB Type-C connectors for connected USB compliant components and for transferring information and power between components.

FIG. 2A is a schematic diagram of an example USB protocol stack 200 in accordance with embodiments of the present disclosure. The USB4 protocol stack 200 can include an electrical layer 202 and a logical layer 204. The electrical layer 202 and logical layer 204 can be considered sub-blocks of the physical layer 206. The electrical layer 202 defines electrical signaling characteristics of a USB4 Link including scrambling, encoding, jitter, and voltage. The logical layer 206 establishes a USB4 link between two routers and provides services to transmit and receive streams of bytes between them. The logical layer 204 resides on top of the electrical layer 202 and below the transport layer 208. The logical layer 204 treats the traffic to and from the transport layer 208 as a byte stream.

The services provided by the logical layer 204 are establishment and maintenance of a USB4 Link with a Link Partner, performance scalability via different speeds and widths, error detection and recovery mechanisms, operation with different media such as passive cable, active cable, and re-timers, support for mechanisms such as clocking compensation, data scrambling, and Forward-error-correcting codes, and power management.

A USB4 link is assisted and managed by a companion Sideband Channel that configures parameters of the USB4 link, interacts with re-timers (if present) and performs USB4 link TxFFE handshake, ensures a correct power down/wake up sequence of the USB4 Link transceivers and Retimers.

The transport layer 208 forwards tunneled packets and control packets through the bus. The transport layer 208 defines packet format, routing, Quality-of-Service (QoS) support, flow control, and time synchronization. The transport layer 208 is where protocol MUXing is performed.

The configuration layer 212 performs router configuration tasks and handles incoming control packets. The configuration layer 212 provides an addressing scheme for control packets within the domain, processes control packets, and delivers a reliable transport mechanism for control packets. Control packets provide the connection manager with access to the configuration spaces of a router.

The protocol adapter layer 210 performs mapping between Tunneled Protocol traffic and USB4 Transport layer packets. A protocol adapter layer 210 is defined by the type of tunneled protocol traffic it sends and receives.

A USB4 host supports USB3 Tunneling, DisplayPort Tunneling, and Host-to-Host Tunneling. A USB4 host can also optionally support PCIe Tunneling. A USB4 hub supports USB3 Tunneling, DisplayPort Tunneling, PCIe Tunneling, and Host-to-Host Tunneling. There are multiple ways that a USB4 hub supports DisplayPort Tunneling. For example, the USB4 hub acts as a "pass through" for DisplayPort Tunneling (i.e. the USB4 hub routes tunneled traffic directly between two of its USB4 Ports). The USB4 hub contains a DP OUT Adapter that receives Tunneled DisplayPort traffic from a USB4 Port and sends it to a DisplayPort Sink.

Figure 2B:
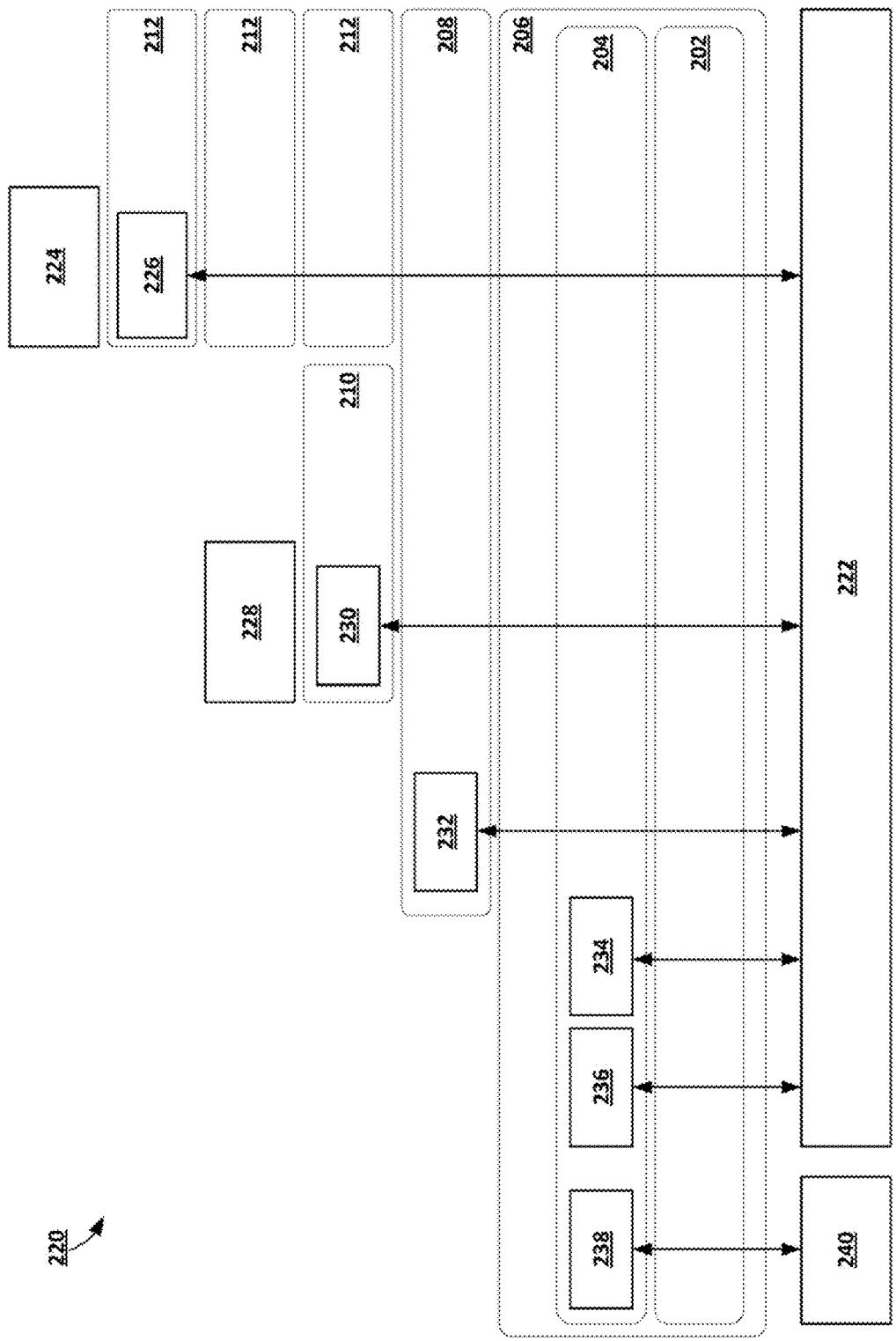
FIG. 2B is a schematic diagram illustrating example universal serial bus functional layer communication pathways in accordance with embodiments of the present disclosure.

FIG. 2B is a schematic diagram 220 illustrating example universal serial bus functional layer communication pathways in accordance with embodiments of the present disclosure. The communication construct can include a USB4 link 222 that communicates packets and ordered sets.

Control packets 226 are used by a connection manager 224 to configure and manage the routers across the bus. Control packets 226 are also used by a router to communicate with the connection manager 224. Control packets 226 are routed over the bus based on a route string that identifies a router's position in a spanning tree. When a control packet 226 originates from the connection manager 224, the route string identifies the router that the packet is targeted to. When a control racket 226 originates from a router, the router string identifies the router that sent the packet. A control adapter in a non-target Router forwards the packet to a USB4 Port. The control adapter of the target router consumes the control packet 226.

Protocol traffic 228 is encapsulated and tunneled over the USB4 fabric in tunneled packets 230. Tunneled packets 230 traverse the USB4 fabric along one or more paths.

Link management packets 232 are confined to a single USB4 Link 222. Link management packets 232 originate in the transport layer 208 of a router at one end of the link and terminate in the transport layer of the router at the other end of the link. The following link management packets are defined: Time Sync packets—Used to synchronize the clocks of the Routers on the bus; Flow Control packets—Used to prevent buffer overflow; Idle packets—Ensure a steady byte stream is fed to the Logical Layer when no other Transport Layer packets are being transmitted.

The logical layer 204 uses ordered sets 234 for tasks such as symbol synchronization, link training, and de-skew between lanes. Ordered sets 238 are 66-bit symbols (at Gen 2 speed) or 132-bit symbols (at Gen 3 speed).

The sideband channel 240 handles the following events: Lane Initialization; Connection or disconnect on a USB4 port; Lane disable or enable; and Entry or exit from Sleep state.

Low frequency periodic signaling (LFPS) 236 is used for in-band communication between two Link Partners when exiting power management link states.

Transport layer packets are either tunneled packets from protocol adapter layers, control packets from the configuration layer, or generated within transport layer (namely, link management packets generated within the transport layer).

Tunneled packets are generated by the protocol adapter layer of a source adapter and handed off to the transport layer. A tunneled packet shall have the header defined for transport layer packets in Table 1. The protocol adapter layer of a source adapter shall fragment protocol traffic larger than 256 bytes into multiple tunneled packets. Reassembly of protocol traffic from tunneled packets shall be performed by the protocol adapter layer of the destination adapter.

The size of a transport layer packet is always a multiple of 4 bytes. The protocol adapter layer of a source adapter shall add between 0 and 3 bytes of padding to the payload of a tunneled packet to ensure that the tunneled packet is of a size that is a multiple of 4 bytes. The protocol adapter layer of the destination adapter shall remove any bytes of padding.

The content of the padding bytes is implementation-specific and cannot be assumed to have any specific values. However, it is recommended that zero-byte padding be used.

Figure 3:
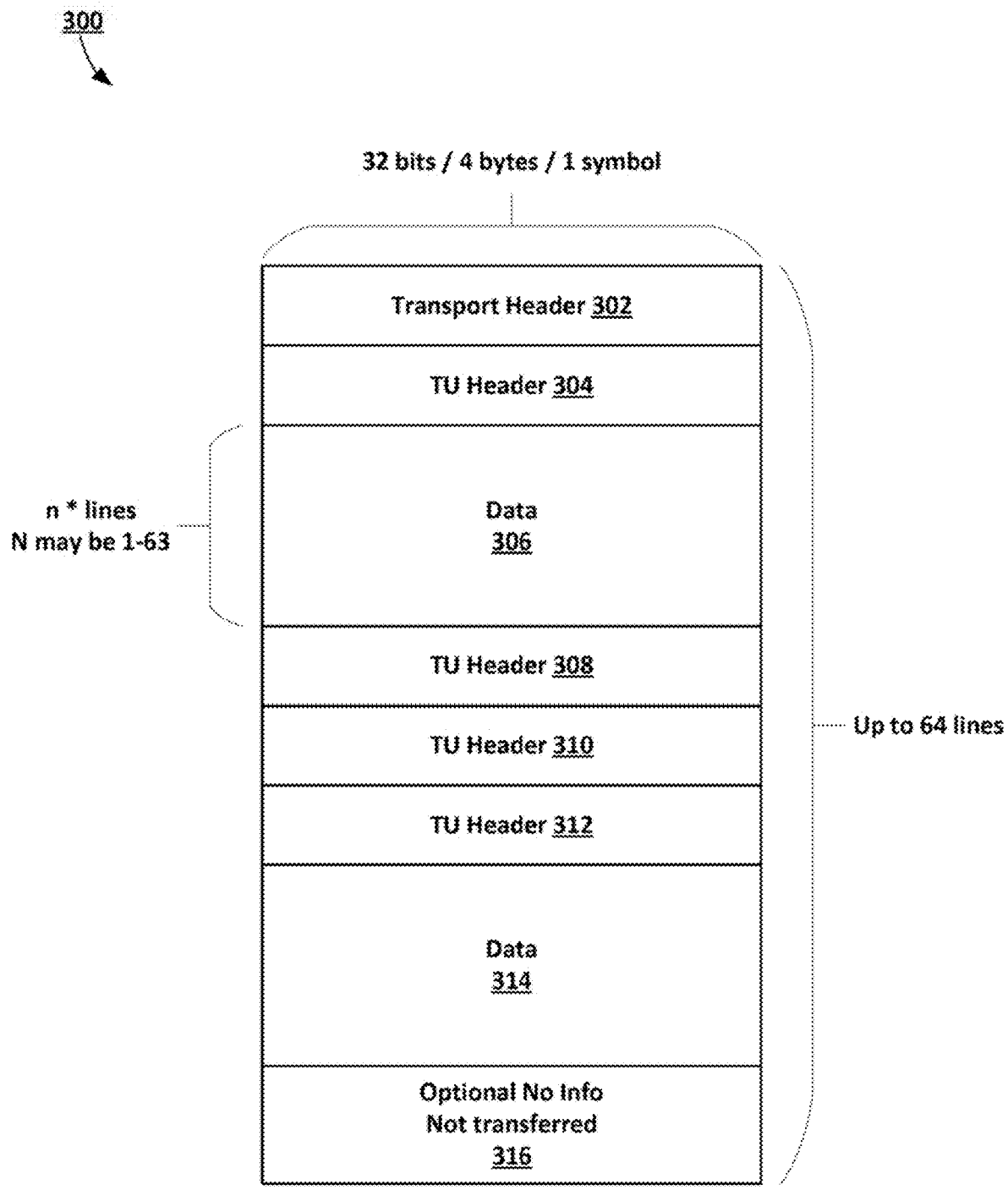
FIG. 3 is a schematic diagram of an example universal serial bus packet in accordance with embodiments of the present disclosure.

FIG. 3 is a schematic diagram of an example USB packet in accordance with embodiments of the present disclosure. In USB4, each packet size can include 256 bytes inclusive of headers. There are two type of headers: Transport Layer Header format, which includes a Protocol Defined Field (PDF) and Length—contain the payload size in bytes excluding the padding size. A second type of header is a Transfer Unit header defined per a specific PDF format. The example packet 300 is shown to include a transport layer header 302, as well as several transfer unit headers 304, 308, 310, and 312.

Table 1 illustrates an example transport layer packet header format.

TABLE 1

Transport Layer Header Format.

| Bits | Field | Description |
|---|---|---|
| 7:0 | HEC | Header Error Control |
| 15:8 | Length | Length - shall contain the payload size in bytes excluding the padding size. A value of 00h is used to indicate a payload size of 256 bytes (all data) |
| 26:16 | HopID | HopID - Uniquely identifies a path in the context of a link. |
| 27 | SuppID | Supplemental ID - Used to distinguish certain types of link management packets that need additional distinction. Set to 0b in a tunneled packet. |
| 31:28 | PDF | Protocol Defined Field - contents depend on packet type. Tunneled packets: defined by the protocol adapter layer. Link management and control packets: together with the SuppID and HopID fields, identifies the link management or control packet type. |

The packet 300 can also include data fields 306 and 314. The length of the data fields can be defined by the transport layer header 302.

The video and audio data carried over a DisplayPort SST Main-Link is organized into frames. Each frame contains several active scan lines followed by a vertical blanking period. Each scan line contains active pixel data followed by a horizontal blanking period. The active pixel data is organized into fixed-size chunks called Transfer Units. Each Transfer Unit (TU) contains active pixel data followed by Stuffing Symbols. Stuffing Symbols are also sent during the horizontal and vertical blanking periods.

When a DisplayPort SST Main-Link is mapped onto USB4, the continuous main-link data stream is encapsulated into tunneled packets. Before encapsulation, all the stuffing symbols (within a TU and during the blanking periods) are discarded by the DP_IN Adapter. Stuffing Symbols are recreated by the DP OUT Adapter when the Main-Link data stream is extracted from the tunneled packets. In order to enable accurate reconstruction of the Stuffing Symbols at the DP OUT Adapter, the DP_IN Adapter includes a fill count field in each tunneled packet. The fill count field specifies the number of Stuffing Symbols that were discarded immediately preceding the packet.

Figure 4:
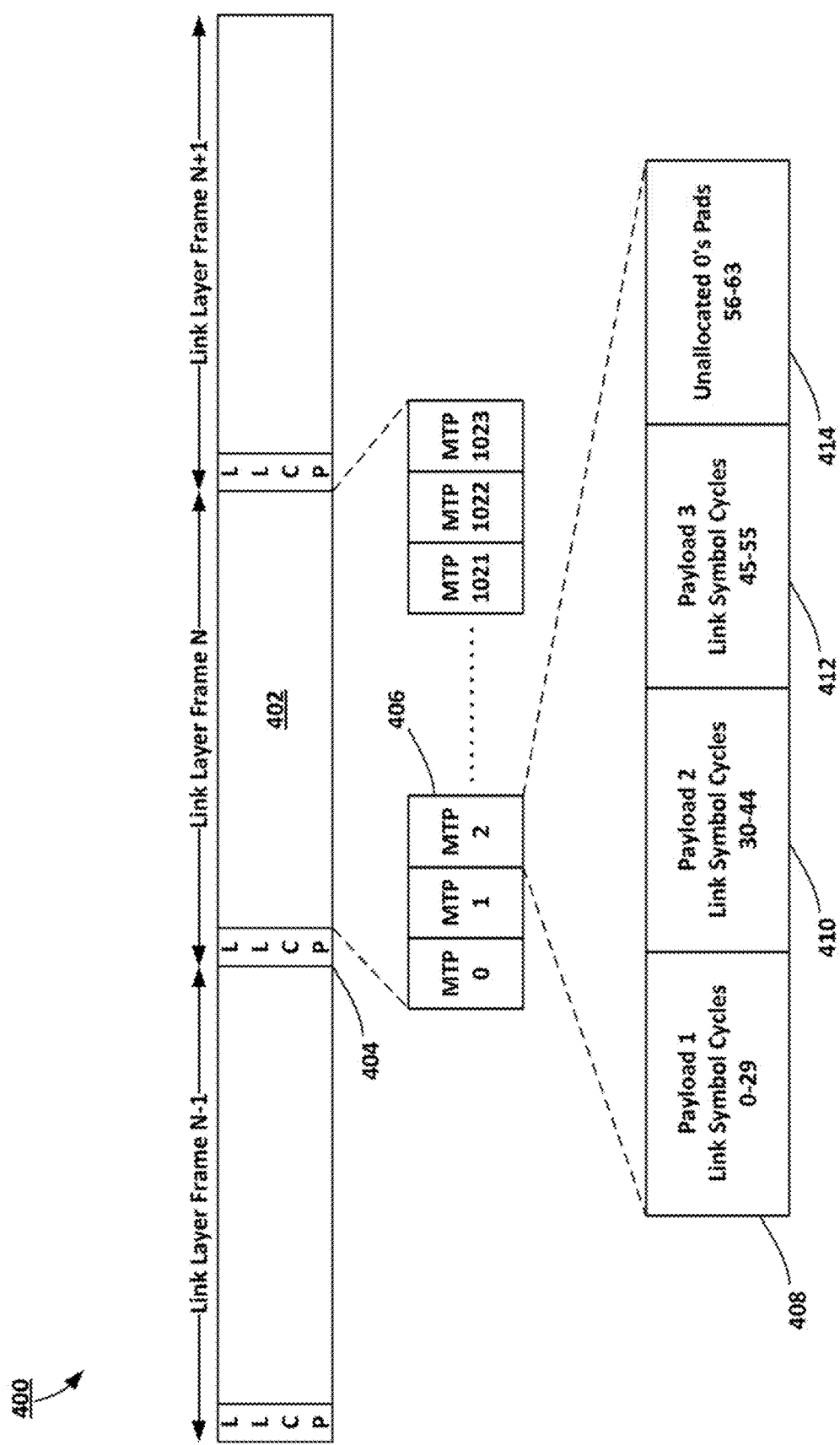
FIG. 4 is a schematic diagram of an example display port signal in accordance with embodiments of the present disclosure.

FIG. 4 is a schematic diagram of an example display port signal 400 in accordance with embodiments of the present disclosure. A display port link layer operates as four main link lanes, each lane symbol data size is 32 bits, and each valid link layer clock carries a total of 128 bits. DisplayPort 2.0 link layer frames can countian 1024 multi-stream transport packets (MTP). FIG. 4 illustrates an example DP2.0 link layer MTP and link layer frames.

An example link layer frame N 402 can include 1024 MTPs, such as MTP 2 406. Based on DisplayPort specification each stream includes useful data, control information and staffing symbols. Every 64 link symbols (or valid clocks cycles) are named slots: each Multi Stream Transport Packet (MTP) includes 64 slots. The DisplayPort specification allows for the transfer of up to 64 separate streams over a link, one stream per each slot, or combine multiple slots for single stream. FIG. 4 shows an example of three streams, where each stream uses a different number of slots: (Payload 1 408 uses slots 0-29, Payload 2 410 uses slots 30-44, and Payload 3 412 uses slots 45-55). In addition, slots 56-63 414 are unallocated and are populated with pads, having a value of 0. Un-used slots are un-allocated and are padded by 0x00 data.

Each frame 402 of 1024 MTPs is starts with a link layer control packet (LLCP) 404, which includes four data bytes of information.

This disclosure describes tunneling of DisplayPort 2.0 information using USB4 transport. Logically, the two endpoints of the tunnel are DisplayPort links DPTX and DPRX, as defined by VESA. Over the tunnel itself, control and data are transported, while idles, padding, or filling information used by DisplayPort is stripped from the tunnel.

This disclosure describes a set of reserved tunnel display port configuration data (DPCD) registers from the DPTX perspective and a set of USB4 registers from the USB4 Driver (or connection manager (CM)) perspective to facilitate a communication channel between the USB4 driver and the DPTX. Through this channel the DPTX can query the amount of available bandwidth and can request and secure a portion for display port usage.

Advantages of the present disclosure will be readily apparent to those of skill in the art. Among the various advantages are that the USB4 bandwidth is optimized because bandwidth is not over-allocated for display port signaling. In addition, the DPTX can control the bandwidth requests and optimize the bandwidth it requests when multiple streams are sharing a resource.

Figure 5:
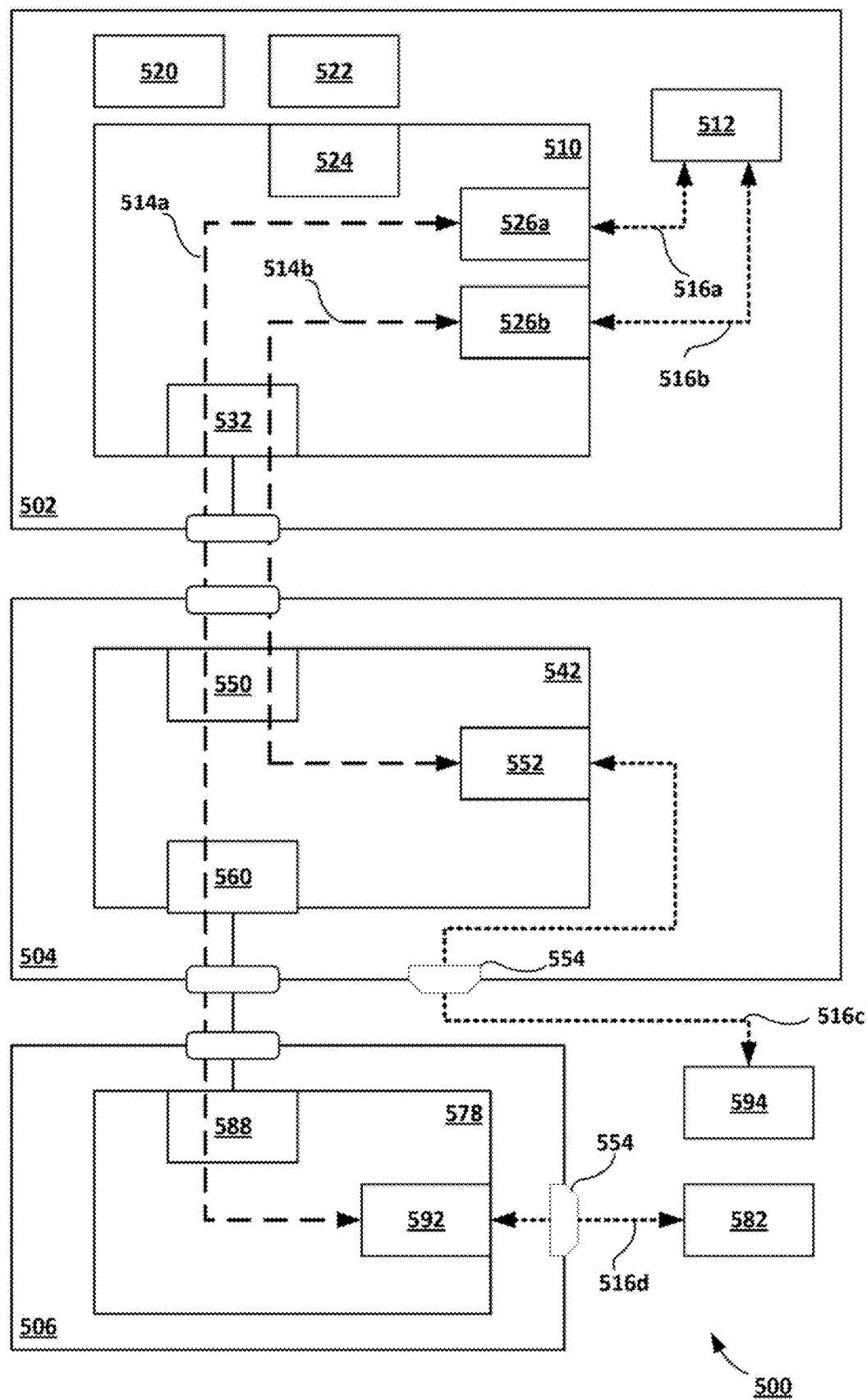
FIG. 5 is a schematic diagram of an example system 500 that couples a display port source to display port sinks through a universal serial bus (USB) hub using display port tunneling in accordance with embodiments of the present disclosure.

FIG. 5 is a schematic diagram of an example system 500 that couples a display port source to display port sinks through a USB fabric using display port tunneling in accordance with embodiments of the present disclosure. The system 500 can include a USB4 host 502 interconnected to a USB4 endpoint 506 through a USB4 hub 504. The USB4 host 502 is similar to the USB4 host 102 described in FIG. 1. The USB4 endpoint 506 is similar to the USB4 endpoint 106 described in FIG. 1. The USB4 hub 504 is similar to the USB4 hub 104 described in FIG. 1.

The USB4 host 502 can include a USB4 host router 510. USB4 host router 510 can include a host interface 524, display port input (DP_IN) adapters 526a, 526b, and a USB4-compatible port 532. The USB4 hub can include a USB4 hub router 542. USB4 hub router 542 can include USB4-compatible ports 550, 560, and a display port output (DP OUT) adapter 552. The DP OUT adapter 552 can be coupled to a DP port 554 that is compatible with DP2.0 protocols. The USB4 device 506 can include a USB4 device router 578. The USB4 device router 578 can include a USB4 port 588 and a DP OUT adapter 592 with a DP2.0 port 554.

The USB4 host can include (or be connected to) a display port source 512. Display port source 512 can be a graphics processing unit or other display port source that can be compliant with a DP2.0 protocol. The display port source 512 can be connected to the DP_IN adapter 526a by a display port link 516a. The display port source 512 can also be connected to the DP_IN adapter 526b by a display port link 516b. Multiple display port output signals can be generated by the display port source 512. The system 500 can support multiple display port signals through display port tunneling.

For example, the display port source 512 can output a first display port signal across link 516a. That first display port signal can be routed to a display port sink 582 through the USB4 host 502, USB4 hub 504, and USB device 506 across USB4 link 514a. A second display port sink 594 can be directly linked to the USB4 hub 504. The display port source 512 can output a second display port signal across link 516b. The second display port signal can be routed to display port sink 594 through the USB4 link 514b.

As the bandwidth demands change, such as by an increase or decrease in the resources used for display port streams, a connection manager 520 can use registers associated with the USB4 driver 522 and the DP_IN adapters 526a, 526b to allocate bandwidth. The adaptable bandwidth allocation prevents the waste of bandwidth resources in cases where the DPTX cannot inform the USB4 Driver of the actual bandwidth that is needed. In addition, the adaptive bandwidth allocation allows for the DPTX to rebalance the available bandwidth, allowing for the optimization of bandwidth allocation for multiple streams of display port data.

The connection manager (CM) 520 can be a software entity that is responsible for enumerating, configuring, and managing a domain. CM 520 performs tasks such as path setup/teardown, hot plug/unplug, and bandwidth management. For example, the CM 520 can be or can include USB driver 522.

Figure 6:
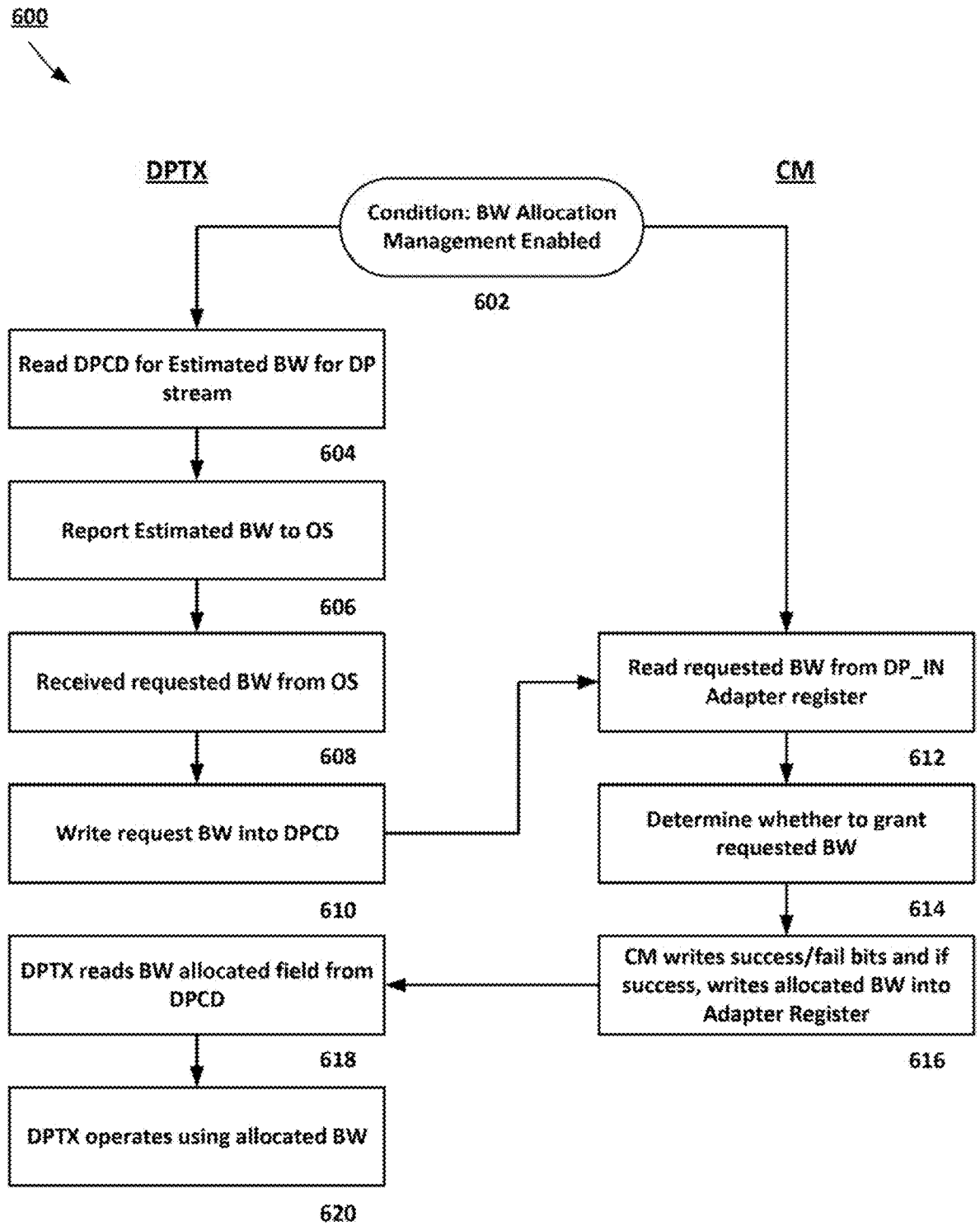
FIG. 6 is a process flow diagram for mapping a display port signal onto a universal serial bus packet in accordance with embodiments of the present disclosure.

FIG. 6 is a process flow diagram 600 for bandwidth allocation for display port tunneling over a universal serial bus link in accordance with embodiments of the present disclosure. At the outset, a bandwidth allocation management bit set is checked by both the USB4 driver (e.g., the connection manager) and the display port driver (DPTX). (602) The CM previously estimated the bandwidth to be allocated to the display port to try to maximize the bandwidth allocated to the DP. The DPTX can read the estimated bandwidth from a DPCD register. (604) The DPTX reports the estimated bandwidth to the operating system (OS). (606) The OS can determine a desired or necessary bandwidth based on the anticipated usage, application, resolution, etc. The requested bandwidth is provided to the DPTX. (608). The DPTX writes the requested bandwidth into the DPCD (e.g., into E0031h "Request BW Update" field of the DPCD register). (610)

The DPCD is mirrored by the DP_IN Adapter registers. The CM can read the requested bandwidth from the DP_IN adapter register (e.g., ADP_DP_CS_8, 7:0). (612) The CM can determine whether to grant the requested bandwidth based on available bandwidth for the display port adapter.

(614). The CM writes a success bit (if the requested bandwidth is granted) or a fail bit (if requested bandwidth is not granted) into the DP_IN adapter register. (616). The CM also writes the Granted bandwidth into the DP_IN adapter register, and sends an IRQ to the DPTX.

After the DPTX receives the IRQ, the DPTX reads the DPCD update status bit (E0025h) to determine whether the request for bandwidth allocation was successful, and if the grant was successful, then the DPTX can read the allocated bandwidth field (E0024h). (618). The DPTX then can operate using the allocated bandwidth. (620).

The following paragraphs provide example pseudocode for performing various aspects of the bandwidth allocation management in accordance with embodiments of the present disclosure.

Bandwidth Allocation Management Enable

The bandwidth Allocation Management for DP Tunneling uses the support of the USB4 Router (through the DP_IN Adapter), the USB4 Driver (or connection manager (CM)), and the DPTX driver. By default, the bandwidth Allocation Management for DP Tunneling is off, and only when both software entities (USB4 driver and DPTX driver) write into a register that their respective bandwidth Allocation Management support the mode is activated.

When the mode is activated the following flows are executed to allocate bandwidth for DP Tunneling:

Bandwidth Allocation

1. The DPTX reads the Estimated Available bandwidth, dynamically set by the CM.
2. The DP_IN Adapter responds with the latest estimation that the USB4 Driver has provided.
3. The DPTX advertises this bandwidth back to the operating system (OS) or other controller logic that controls or manages the DPTX.
4. The OS requests from DPTX to operate in a certain stream characteristic, which implies a certain bandwidth.
5. The DPTX requests bandwidth allocation.
6. The DP_IN Adapter through handshake with the USB4 Driver requests to allocate the bandwidth.
7. If Requested bandwidth is granted by the USB4 Driver—DP In Adapter reports that to DPTX driver.
8. DPTX to operate in a new stream characteristic and Process is done.
9. If request has failed, the USB4 Driver provides the maximum bandwidth that could be and the DP_IN Adapter reports that to the DPTX as a new Estimated bandwidth
10. The DPTX will inform OS that it failed and supply the new, lower estimated bandwidth.
11. The OS will OS requests from DPTX to operate in a new stream characteristic, which implies a lower bandwidth.
12. The DPTX requests the new bandwidth allocation
13. The DP_IN Adapter grants the request—Process is done.

DP Bandwidth Change

In case there is a need to change the DP stream bandwidth, such as the operating system (OS) would like to change the resolution of the stream or disable the stream or activate additional stream on same DP port using MST (multiple Stream), the same process of bandwidth Allocation repeats. In case the new requested bandwidth is lower than the current allocated bandwidth, the change is guaranteed to succeed and the DP_IN Adapter will inform the USB4 Driver that bandwidth was freed up.

Rebalancing Bandwidth

As part of the information a DPTX gets from the DPCD register is the number of the USB4 Link, which the DP Tunnel goes through. In case multiple streams goes through the same USB4 Link, meaning they share the same Link resource, the DPTX is aware of it, and can rebalance the request bandwidth accordingly.

DPTX (e.g., GPU) Behavior

Table 2 provides an example of added display port configuration data (DPCD) registers at the display port source accessible by the DPTX. The registers are mirrored by the DP_IN adapter registers. The DP_IN adapter registers are shown in Table 3.

TABLE 2

Example DPCD Register

| DPCD Address | Byte # | Bit # | Definition within Tunneling Device-specific Field | Read/Write over AUX CH |
|---|---|---|---|---|
| E0020h | | | DP_IN Adapter Capability | Read Only |
| | | 6:0 | Reserved | Read 0 |
| | | 7 | DP tunneling BM mode support | Read only |
| E0021h | | | DP_IN Adapter Tunnel Information | Read Only |
| | | 5:0 | Lane Adapter Number This field indicates the Lane Adapter Number which the DP Tunnel goes through when exiting the Router | |
| | | 7:6 | | |
| E0022h | | | Granularity 0-0.25 G 1-0.5 G 2-1 G 3 and above-reserved | Read only |
| E0023h | | | Estimated BW | Read only |
| E0024h | | | Allocated BW | Read only |
| E0025h | | | Update_Status | Clearable |
| | | 0 | BW Request failed | Read only |
| | | 1 | BW Request successful | (Bit is cleared when 1 is written by way of an AUX_CH write transaction |
| | | 2 | Estimated BW changed | |
| | | 7:3 | Reserved | Read 0s |
| E0030h | | | GPU Capability | Write |
| | | 6:0 | Reserved | Write 0s |
| | | 7 | GPU BW management support | Write |
| E0031h | | | Request BW Update | Write |

Setting Bandwidth Allocation Management Mode

In order to enter the bandwidth Allocation Management mode:
1. DPTX reads DPCD E0020h and verifies Bit 7 is set to 1b which indicates both, DP_IN Adapter and USB4 Driver, support bandwidth Allocation Management mode.
2. DPTX writes DPCD E0030h, setting Bit 7 to 1b.

Requesting Bandwidth Allocation

After entering the bandwidth Allocation Management Mode, the DPTX executes the following flow:
1. DPTX reads DPCD E0022h. Granularity of bandwidth in all bandwidth fields is according to this byte.
2. DPTX reads DPCD E0023h to be aware of the Estimated bandwidth.
3. DPTX sends OS the bandwidth according to the Estimated bandwidth.
4. When instructed by OS for required bandwidth, DPTX writes DPCD E0031h with the requested bandwidth
5. DPTX waits for an IRQ to be received.
6. DPTX Reads E0025h
6.1 If Bit 0 is set to 1b:
6.1.1 DPTX writes DPCD E0025h Bit 0 to a value of 1b.
6.1.2 Process has ended.

6.2 If Bit 1 is set to 1b:
6.2.1 DPTX writes DPCD E0025h Bit 1 to a value of 1b.
6.2.2 DPTX repeats the process from step 2 above.

Changing Bandwidth Allocation

In case OS wants to change the requested bandwidth, DPTX follows C procedure starting from step 2. If the OS is reducing the requested bandwidth, it is guaranteed the process will succeed.

Estimated Bandwidth Change

1. DP_In Adapter initiates IRQ to DPTX.
2. DPTX Reads E0025h
2.1 If Bit 2 is set to 1b
2.1.1 DPTX writes DPCD E0025h Bit 2 to value of 1b.
2.1.2 DPTX with OS decides if to change the requested bandwidth and if so follow C procedure.

Bandwidth Sharing

When multiple screens are attached, a DPTX can read the DPCD E0021h which indicates the Lane Adapter number that the DP Tunnel goes through when exiting the USB4 Router. By reading the Lane Adapter number from all the serviced port, it can conclude which streams are sharing the same Lane Adapter, and may balance bandwidth as needed through the "Requesting bandwidth Allocation" procedure described above.

DP_IN Adapter Behavior

Table 3 provides example register entries for the DP_IN Adapter registers. The DP_IN Adapter register is mirrored by the DPCD registers, shown above.

TABLE 3

Example DP_IN Adapter Register Entries

| DW | Register Name | Bit(s) | Field name and Description | Type | Default Value |
|---|---|---|---|---|---|
| 2 | ADP_DP_CS_2 | | | | |
| | | 10 | Acknowledge | R/W | 0 |
| | | 12:11 | Granularity | | 0 |
| | | 18:13 | Lane Adapter Number | | 0 |
| | | 20 | CM BW Mgmt Mode Support | R/W | 0 |
| | | 31:24 | Estimated BW | R/W | 0 |
| 6 | DP_STATUS | | | | |
| | | 31:24 | Granted BW | R/W | 0 |
| 8 | ADP_DP_CS_8 | | | | |
| | | 7:0 | Requested BW | RO | 0 |
| | | 30 | DPTX BW Mgmt Mode Support | RO | 0 |
| | | 31 | Request | RO | 0 |

Configuration

When the USB4 Driver enables the DP Tunneling it sets:
ADP_DP_CS_2[12:11] (Granularity);
ADP_DP_CS_2[18:13] (Lane Adapter Number);
ADP_DP_CS_2[20] (CM bandwidth Management Mode support) to 1b if it supports bandwidth Allocation Management mode;
ADP_DP_CS_2[31:24] (Estimated bandwidth).

When DPTX reads the following DPCDs, the DP_IN Adapter copies the values from the registers:
DPCD E0020h[7]<=ADP_DP_CS_2[20];
DPCD E0021h[5:0]<=ADP_DP_CS_2[18:13];
DPCD E0022h[7:0]<={0,ADP_DP_CS_2[12:11]};
DPCD E0023h[7:0]<=ADP_DP_CS_2[31:24];

Setting Bandwidth Allocation Management Mode

If DPTX write DPCD E0030h[0] to 1b, meaning that it enables the bandwidth Allocation Management mode, the DP_IN Adapter sets ADP_DP_CS_8[30] (DPTX bandwidth Management Mode support) to 1b.

Requesting Bandwidth Allocation

When DPTX Writes DPCD E0031h, setting the Request bandwidth Update field, the DP_IN Adapter does the following:
Sets ADP_DP_CS_8[7:0] (Requested bandwidth)<=Request bandwidth Update;
Sets ADP_DP_CS_8[31] (Request) to 1b;
Sets ADP_DP_CS_2[10] (Acknowledge) to 0b;
Sends Notification Packet to the USB4 Driver (With new Event Code for bandwidth allocation flow);
Polls ADP_DP_CS_2[10] (Acknowledge) until it is set to 1b;
Reads DP_STATUS[31:24] (Granted bandwidth);
Set E0024h<=DP_STATUS[31:24] (Granted bandwidth);
If Granted bandwidth>=Requested bandwidth request was successful, then
  a. Set E0025h Bit 1 to 1b (Success);
else
  a. Set E0024h<=DP_STATUS[31:24] (Granted bandwidth);
  b. Set E0025h Bit 0 to 1b (Fail);
  c. Set E0025h Bit 2 to 1b (Estimated bandwidth changed);
Send IRQ.
Process ended.

Notify Estimated Bandwidth change

When USB4 Driver changes ADP_DP_CS_2[31:24] (Estimated bandwidth), the DP_IN Adapters does the following:
Set E0025h bit 2 to 1b (Estimated bandwidth changed);
Send IRQ;
Process ended.

USB4 Driver (CM) Behavior

The CM uses the registers defined Table 3.

DisplayPort Tunneling Setup

When CM configures the DisplayPort tunneling it sets the registers described above for DP_IN Adapter Behavior: Configuration. In addition, the CM writes the Estimated bandwidth for the DP stream into ADP_DP_CS_2[31:24] (Estimated bandwidth).

Allocating Bandwidth

When a CM receives a Notification Packet containing the new Event Code for bandwidth Allocation the CM carries out the following steps:
1. The CM calculates the total available bandwidth for that DP_IN Adapter (including any bandwidth which is already allocated) and allocate it to the DP_IN Adapter;
2. The CM writes the allocated bandwidth to DP_STATUS[31:24] (Granted bandwidth); and
3. The CM sets ADP_DP_CS_2[10] (Acknowledge) to 1b.

Estimated Bandwidth Maintenance

Whenever the CM handles bandwidth over the USB4 Port, the CM updates ADP_DP_CS_2[31:24] (Estimated bandwidth) as soon as possible.

Figure 7:
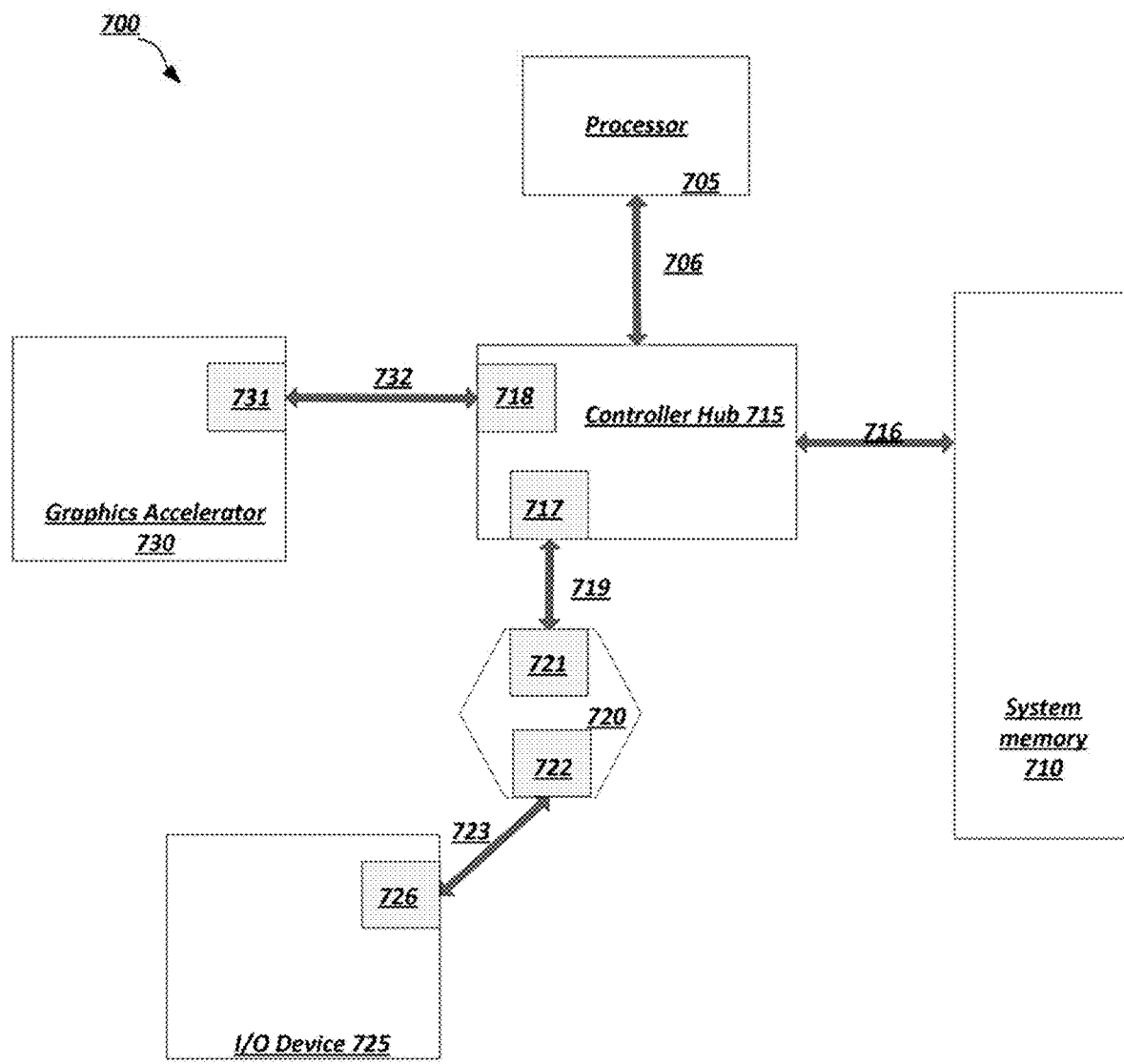
FIG. 7 illustrates an embodiment of a computing system including an interconnect architecture.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root port controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
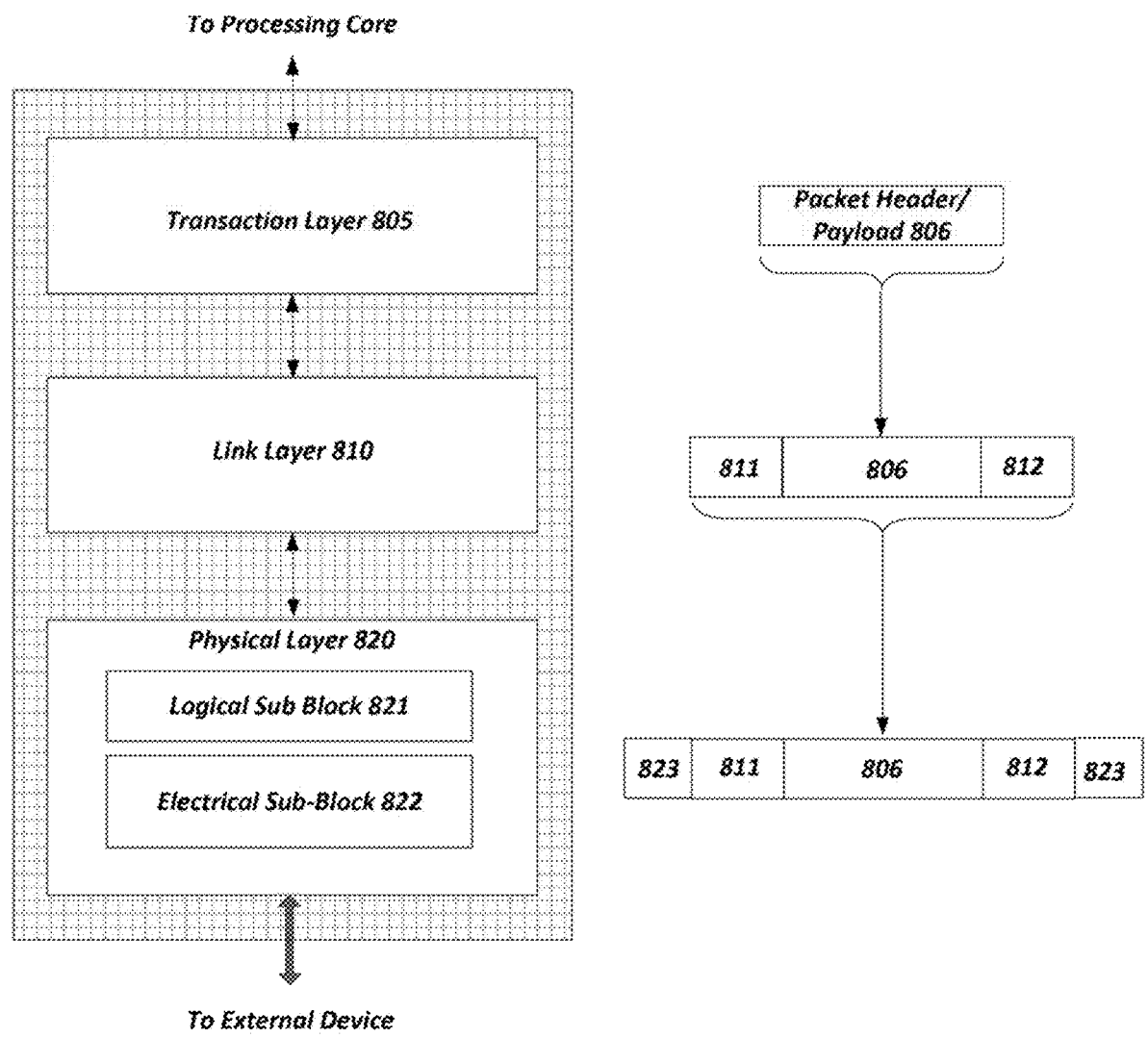
FIG. 8 illustrates an embodiment of an interconnect architecture including a layered stack.

Turning to FIG. 8 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 705 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 706. Format for current packet headers/payloads may be found in the PCIe specification at the PCIe specification website.

Figure 9:
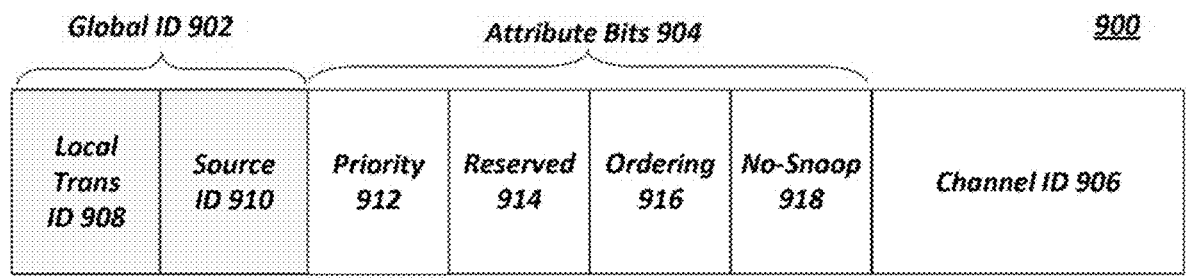
FIG. 9 illustrates an embodiment of a request or packet to be generated or received within an interconnect architecture.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system.

Other potential uses include tracking modifications of default transaction ordering and association of transaction with channels.

Transaction descriptor 900 includes global identifier field 902, attributes field 904, and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 10:
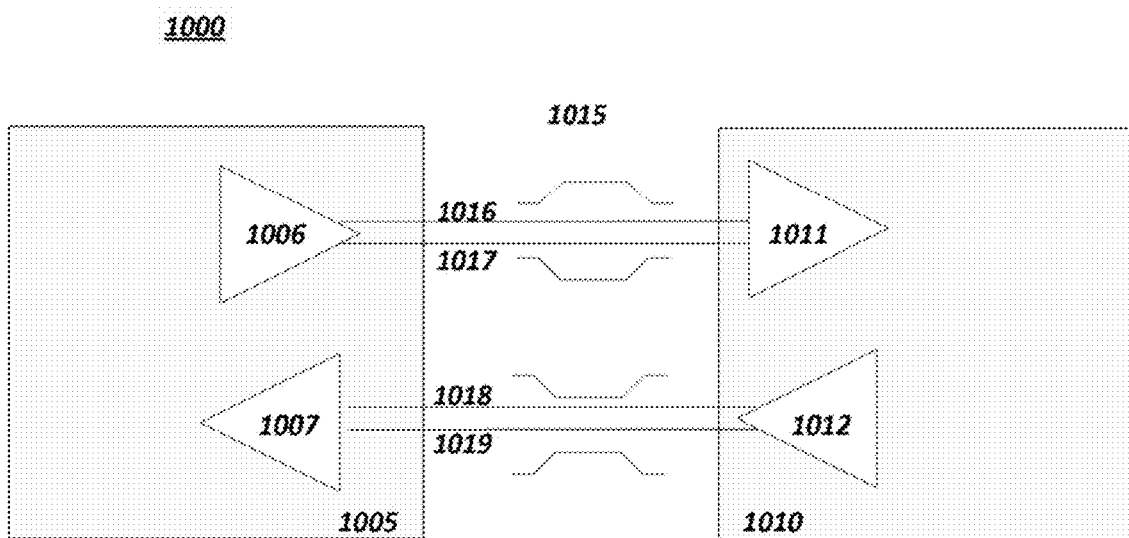
FIG. 10 illustrates an embodiment of a transmitter and receiver pair for an interconnect architecture.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, i.e. a rising edge, line 1017 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 11:
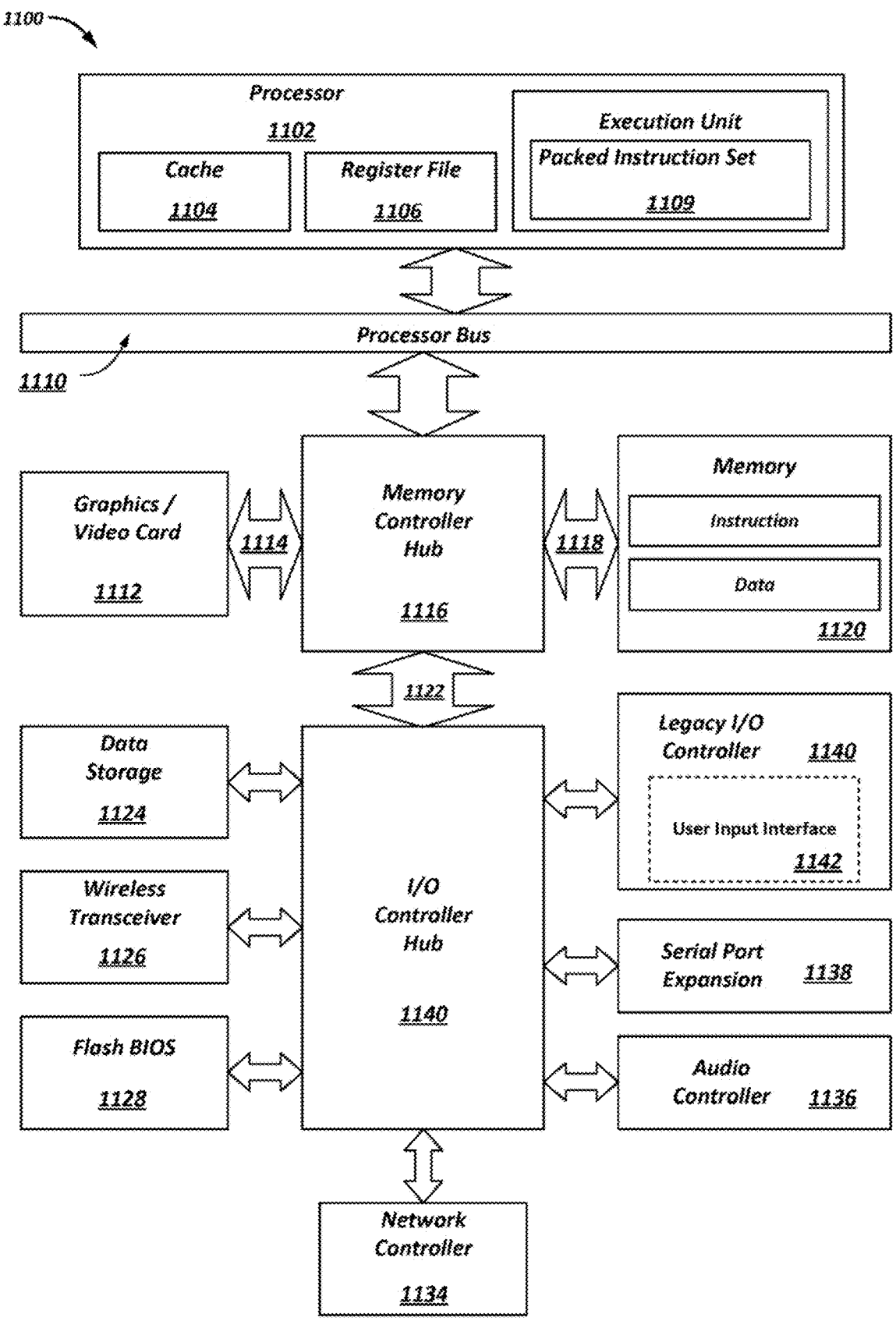
FIG. 11 illustrates another embodiment of a block diagram for a computing system including a processor.

Turning to FIG. 11, a block diagram of an exemplary computer system formed with a processor that includes execution units to execute an instruction, where one or more of the interconnects implement one or more features in accordance with one embodiment of the present disclosure is illustrated. System 1100 includes a component, such as a processor 1102 to employ execution units including logic to perform algorithms for process data, in accordance with the present disclosure, such as in the embodiment described herein. System 1100 is representative of processing systems based on the PENTIUM III™, PENTIUM 4™, Xeon™, Itanium, XScale™ and/or StrongARIV1™ microprocessors available from Intel Corporation of Santa Clara, California, although other systems (including PCs having other microprocessors, engineering workstations, set-top boxes and the like) may also be used. In one embodiment, sample system 1000 executes a version of the WINDOWS™ operating system available from Microsoft Corporation of Redmond, Washington, although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1008 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1124, wireless transceiver 1126, Flash BIOS 1028, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1020 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the disclosure may be utilized on one or more interconnect illustrated in FIG. 11. For example, an on-die interconnect (ODI), which is not shown, for coupling internal units of processor 1102 implements one or more aspects of the disclosure described above. Or the disclosure is associated with a processor bus 1110 (e.g. Intel Quick Path Interconnect (QPI) or other known high performance computing interconnect), a high bandwidth memory path 1118 to memory 1120, a point-to-point link to graphics accelerator 1112 (e.g. a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. The data storage device 1124 can comprise a hard disk drive, a floppy disk drive, a CD-ROM device, a flash memory device, or other mass storage device.

Figure 12:
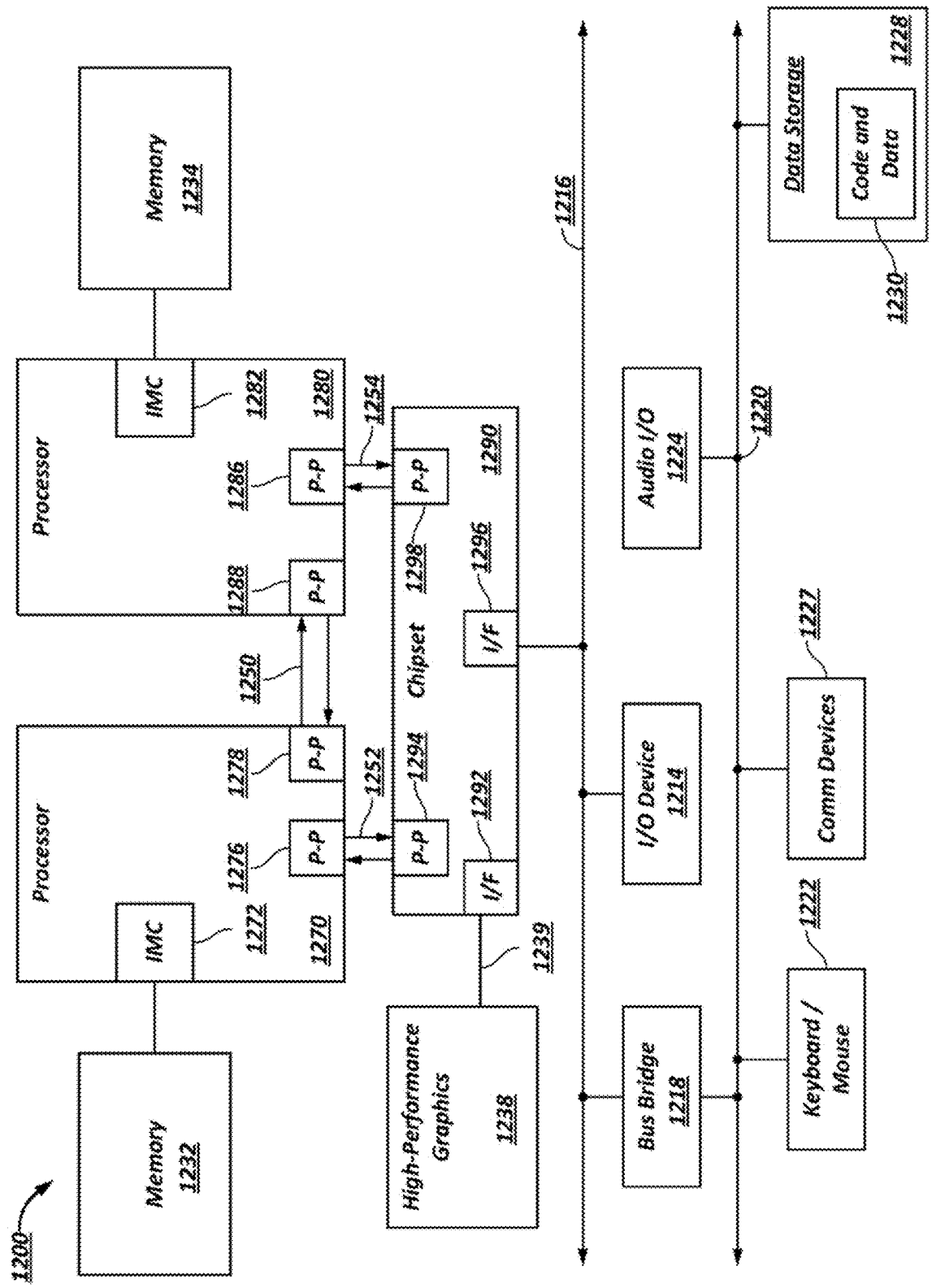
FIG. 12 illustrates an embodiment of a block for a computing system including multiple processor sockets.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1138 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user.

In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus comprising a display port input (DP_IN) adapter, the DP_IN adapter comprising DP_IN adapter registers; and connection manager logic to receive a notification message to request a bandwidth allocation for the DP_IN adapter, determine that bandwidth is available for the DP_IN adapter, and write a new bandwidth allocation into a register of the DP_IN adapter registers reserved for an indication of granted bandwidth.

Example 2 may include the subject matter of example 1, the DP_IN adapter to read a requested bandwidth register value from the DP_IN adapter registers; and send a notification message to the connection manager to request the bandwidth allocation.

Example 3 may include the subject matter of any of examples 1-2, the DP_IN adapter to populate a DP_IN adapter register value from a corresponding display port configuration data (DPCD) register value.

Example 4 may include the subject matter of any of examples 1-3, the connection manager to write a display port tunneling bandwidth management support bit to a connection manager bandwidth management mode support field of the DP_IN adapter registers; and write an estimated bandwidth value into an estimated bandwidth register field of the DP_IN adapter registers.

Example 5 may include the subject matter of example 4, the connection manager to estimate a bandwidth allocation for the DP_IN adapter and write the estimated bandwidth allocation into the estimated bandwidth register field.

Example 6 may include the subject matter of any of examples 1-5, the connection manager to determine a total bandwidth allocated for the DP_IN adapter; and write the total bandwidth allocated for the DP_IN adapter into a register of the DP_IN adapter registers reserved for an indication of granted bandwidth.

Example 7 may include the subject matter of any of examples 1-6, further comprising a universal serial bus (USB) host device; and a USB host router comprising the DP_IN adapter.

Example 8 may include the subject matter of any of examples 1, wherein the connection manager comprises a universal serial bus (USB) driver.

Example 9 is an apparatus comprising a display port transmitter (DPTX) to comprise a display port configuration data (DPCD) register set, the DPTX to read an estimated bandwidth allocation from the DPCD register set; send the estimated bandwidth allocation to a controller logic; receive an indication from the controller logic to increase bandwidth for the DPTX; and write a requested bandwidth into a request bandwidth update field of the DPCD register set.

Example 10 may include the subject matter of example 9, the DPTX to read a bandwidth allocation management mode bit to determine that a connect device supports bandwidth allocation management; write to a DPTX bandwidth management support field of the DPCD register set.

Example 11 may include the subject matter of any of examples 9-10, the DPTX to receive an interrupt associated with the requested bandwidth; read a status register in the DPCD register set; determine that the requested bandwidth is granted based on a bandwidth request succeeded field of the status register.

Example 12 may include the subject matter of any of examples 9-11, the DPTX to transmit data using the granted requested bandwidth.

Example 13 may include the subject matter of any of examples 9-12, wherein the controller logic comprises an operating system.

Example 14 is a system comprising a host router comprising connection manager logic, a display port adapter, and a display port adapter register to comprise display port adapter register values. A display port source device comprises a display port transmitter connected to the display port adapter; a display port configuration data (DPCD) register to comprise display port configuration register values for the display port, the display port transmitter to write to the DPCD register. The display port adapter is to map DPCD register values to the display port adapter register. The connection manager logic is to receive a notification message requesting bandwidth allocation for the display port transmitter, determine an allocated bandwidth for the display port transmitter, and write the allocated bandwidth into the display port adapter register.

Example 15 may include the subject matter of example 14, the display port adapter to read a requested bandwidth register value from the display port adapter registers; and send a notification message to the connection manager logic to request the bandwidth allocation.

Example 16 may include the subject matter of any of examples 14-15, the display port adapter to populate a display port adapter register value from a corresponding DPCD register value.

Example 17 may include the subject matter of any of examples 14-16, the connection manager logic to write a display port tunneling bandwidth management support bit to a connection manager bandwidth management mode support field of the display port adapter registers; and write an estimated bandwidth value into an estimated bandwidth register field of the display port adapter registers.

Example 18 may include the subject matter of example 17, the connection manager logic to estimate a bandwidth allocation for the display port adapter and write the estimated bandwidth allocation into the estimated bandwidth register field.

Example 19 may include the subject matter of any of examples 14-18, the connection manager logic to determine a total bandwidth allocated for the display port adapter; and write the total bandwidth allocated for the display port adapter into a register of the display port adapter registers reserved for an indication of granted bandwidth.

Example 20 may include the subject matter of any of examples 14-19, further comprising a universal serial bus (USB) host device comprising the host router.

Example 21 may include the subject matter of any of examples 14-20, the display port source device to read a bandwidth allocation management mode bit to determine that a connect device supports bandwidth allocation management; write to a display port source device bandwidth management support field of the DPCD register set.

Example 22 may include the subject matter of any of examples 14-21, the display port source device to receive an interrupt associated with the requested bandwidth; read a status register in the DPCD register set; determine that the requested bandwidth is granted based on a bandwidth request succeeded field of the status register.

Example 23 may include the subject matter of any of examples 14-22, the display port source device to transmit data using the granted requested bandwidth.

Example 24 may include the subject matter of any of examples 14-23, wherein the controller logic comprises an operating system.

Example 25 is a method for managing bandwidth of a display port transmitter, the method can include reading a display port adapter register value indicating that the display port transmitter is requesting a change in bandwidth allocation; determining that the change in bandwidth allocation can be granted for the display port adapter; and setting display port register information to indicate that the requested bandwidth was granted.

Example 26 may include the subject matter of example 25, and can also include sending an interrupt to the display port transmitter to alert the display port transmitter that the request for a change in bandwidth allocation has been addressed.

Example 27 may include the subject matter of any of examples 25-26, and can also include receiving, at the display port transmitter, an indication from an operating system, that a change in bandwidth is requested. The display port transmitter can write a request to change bandwidth into a display port configuration data (DPCD) register. The DPCD registers is mirrored by the display port adapter register. The display port adapter can read the corresponding field in the display port adapter register that indicates that the display port transmitter is requesting a change in bandwidth. The display port adapter then sends a notification message to the connection manager to change the bandwidth.

Example 28 may include the subject matter of example 27, the connection manager can write to the display port adapter register indicating that the bandwidth has been changed. The connection manager can send an interrupt to the display port transmitter.

The display port transmitter can read a corresponding register field to read that the bandwidth has been changed. The display port transmitter can transmit data using the new allocated bandwidth.

In an example, an apparatus comprises a USB connection manager to receive (e.g., by reading a DP_IN adapter register) a request from a display port driver to change bandwidth allocation for the display port. The connection manager can determine whether to grant the request for the change in bandwidth allocation. The connection manager can then write an acknowledgment of the change in bandwidth allocation to the DP_IN adapter register, along with the new bandwidth for the display port. The connection manager can then send an interrupt to the display port driver. The bandwidth allocation value and a success bit indicating that the requested bandwidth was granted can also be written into the DP_IN adapter register.

The allocated (or granted) bandwidth and the success bit are mirrored by the DPCD register. After receiving the interrupt from the connection manager, the display driver can check the DPCD register to see that the request was successful and can check the allocated bandwidth.

In another example, the connection manager can set an estimated bandwidth value into the DP_IN adapter register. The display port driver can report the estimated bandwidth to the operating system. The operating system can determine that the estimated bandwidth is too high or too low, and make a request to change the bandwidth for the display port. The display port driver can write a for a bandwidth update in a DPCD register. The connection manager can read the bandwidth update as a request from the display port driver to change the allocated bandwidth for the display port.

What is claimed is:

1. An apparatus comprising:
a display port input (DP_IN) adapter, the DP_IN adapter comprising DP_IN adapter registers; and
connection manager logic to:
receive a notification message to request a bandwidth allocation for the DP_IN adapter,
determine that bandwidth is available for the DP_IN adapter, and
write a new bandwidth allocation into a register of the DP_IN adapter registers reserved for an indication of granted bandwidth, wherein the new bandwidth allocation is less than a maximum currently available bandwidth,
wherein the DP_IN adapter registers comprise a granularity of bandwidth register, wherein the granularity of bandwidth register is indicative of a granularity of bandwidth requests,
wherein the notification message to request a bandwidth allocation comprises a number, wherein an amount of bandwidth requested by the notification message corresponds to the number times a value of the granularity of bandwidth register.

2. The apparatus of claim 1, the DP_IN adapter to:
read a requested bandwidth register value from the DP_IN adapter registers; and
send a notification message to the connection manager to request the bandwidth allocation.

3. The apparatus of claim 1, the DP_IN adapter to populate a DP_IN adapter register value from a corresponding display port configuration data (DPCD) register value.

4. The apparatus of claim 1, the connection manager to:
write a display port tunneling bandwidth management support bit to a connection manager bandwidth management mode support field of the DP_IN adapter registers; and
write an estimated bandwidth value into an estimated bandwidth register field of the DP_IN adapter registers.

5. The apparatus of claim 4, the connection manager to estimate a bandwidth allocation for the DP_IN adapter and write the estimated bandwidth allocation into the estimated bandwidth register field.

6. The apparatus of claim 1, the connection manager to:
determine a total bandwidth allocated for the DP_IN adapter; and
write the total bandwidth allocated for the DP_IN adapter into a register of the DP_IN adapter registers reserved for an indication of granted bandwidth.

7. An apparatus comprising:
a display port transmitter (DPTX) to comprise a display port configuration data (DPCD) register set, the DPTX to:
read an estimated bandwidth allocation from the DPCD register set;
send the estimated bandwidth allocation to a controller logic;
receive an indication from the controller logic to increase bandwidth for the DPTX; and
write a requested bandwidth into a request bandwidth update field of the DPCD register set, wherein the requested bandwidth is less than a maximum currently available bandwidth,
wherein to write the requested bandwidth comprises to write a number into a register, wherein an amount of the requested bandwidth corresponds to the number times a value of a granularity of bandwidth register, wherein the granularity of bandwidth register is indicative of a granularity of bandwidth requests.

8. The apparatus of claim 7, the DPTX to:
read a bandwidth allocation management mode bit to determine that a connected device supports bandwidth allocation management;
write to a DPTX bandwidth management support field of the DPCD register set.

9. The apparatus of claim 7, the DPTX to:
receive an interrupt associated with the requested bandwidth;
read a status register in the DPCD register set;
determine that the requested bandwidth is granted based on a bandwidth request succeeded field of the status register.

10. The apparatus of claim 9, the DPTX to transmit data using the granted requested bandwidth.

11. The apparatus of claim 7, wherein the controller logic comprises an operating system.

12. The apparatus of claim 7, wherein to receive an indication from the controller logic to increase bandwidth for the DPTX comprises to receive a target amount of bandwidth, wherein to write the requested bandwidth into a request bandwidth register comprises to write the target amount of bandwidth into the request bandwidth register.

13. A system comprising:
a host router comprising:
connection manager logic,
a display port adapter, and
a display port adapter register to comprise display port adapter register values; and
a display port source device comprising:
a display port transmitter connected to the display port adapter;
a display port configuration data (DPCD) register to comprise display port configuration register values for the display port, the display port transmitter to write to the DPCD register;
wherein the display port adapter is to map DPCD register values to the display port adapter register;
wherein the connection manager logic is to:
receive a notification message requesting bandwidth allocation for the display port transmitter,
determine an allocated bandwidth for the display port transmitter, and
write the allocated bandwidth into the display port adapter register, wherein the allocated bandwidth is less than a maximum currently available bandwidth,
wherein the display port adapter register comprise a granularity of bandwidth register, wherein the granularity of bandwidth register is indicative of a granularity of bandwidth requests,
wherein the notification message requesting bandwidth allocation comprises a number, wherein an amount of bandwidth requested by the notification message corresponds to the number times a value of the granularity of bandwidth register.

14. The system of claim 13, the display port adapter to:
read a requested bandwidth register value from the display port adapter registers; and
send a notification message to the connection manager logic to request the bandwidth allocation.

15. The system of claim 13, the display port adapter to populate a display port adapter register value from a corresponding DPCD register value.

16. The system of claim 13, the connection manager logic to:
write a display port tunneling bandwidth management support bit to a connection manager bandwidth management mode support field of the display port adapter registers; and
write an estimated bandwidth value into an estimated bandwidth register field of the display port adapter registers.

17. The system of claim 16, the connection manager logic to estimate a bandwidth allocation for the display port adapter and write the estimated bandwidth allocation into the estimated bandwidth register field.

18. The system of claim 13, the connection manager logic to:
determine a total bandwidth allocated for the display port adapter; and
write the total bandwidth allocated for the adapter into a register of the display port adapter register reserved for an indication of granted bandwidth.

* * * * *